US012636901B1

(12) United States Patent
Turgeman

(10) Patent No.: US 12,636,901 B1
(45) Date of Patent: May 26, 2026

(54) METHOD OF FABRICATING A THERMAL TRANSFER IMAGE

(71) Applicant: Shahar Turgeman, Boca Raton, FL (US)

(72) Inventor: Shahar Turgeman, Boca Raton, FL (US)

( * ) Notice: Subject to any disclaimer, the term of this patent is extended or adjusted under 35 U.S.C. 154(b) by 75 days.

(21) Appl. No.: 18/820,887

(22) Filed: Aug. 30, 2024

Related U.S. Application Data

(60) Provisional application No. 63/558,632, filed on Feb. 27, 2024.

(51) Int. Cl.

| | |
|---|---|
| ***B41M 3/12*** | (2006.01) |
| ***B41M 3/00*** | (2006.01) |
| ***B41M 5/025*** | (2006.01) |
| ***B41M 7/00*** | (2006.01) |
| ***B44C 1/17*** | (2006.01) |

(52) U.S. Cl.
CPC .............. *B41M 3/12* (2013.01); *B41M 3/008* (2013.01); *B41M 5/0256* (2013.01); *B41M 7/0081* (2013.01); *B41M 7/009* (2013.01); *B44C 1/1712* (2013.01); *B41M 2205/06* (2013.01); *B41M 2205/10* (2013.01)

(58) Field of Classification Search
CPC ...... B41M 3/12; B41M 3/008; B41M 5/0256; B41M 7/0081; B41M 7/009; B41M 2205/06; B41M 2205/10; B44C 1/1712
See application file for complete search history.

(56) References Cited

U.S. PATENT DOCUMENTS

| | | | |
|---|---|---|---|
| 155,472 | A | 9/1874 | Smythe |
| 178,507 | A | 6/1876 | Burrows |
| 243,169 | A | 6/1881 | Sprague |
| 835,667 | A | 11/1906 | Donnelly |
| 1,461,048 | A | 7/1923 | Roman |
| 3,902,072 | A | 8/1975 | Quinn |
| 3,930,625 | A | 1/1976 | Krivka |
| 3,942,839 | A | 3/1976 | Chalk |
| 3,974,395 | A | 8/1976 | Bright |
| 4,087,927 | A | 5/1978 | Basmajian |
| 4,146,264 | A | 3/1979 | Korzeniewski |
| 4,256,972 | A | 3/1981 | Wyatt |
| 4,280,061 | A | 7/1981 | Lawson-Tancred |
| 4,289,970 | A | 9/1981 | Deibert |
| 4,330,714 | A | 5/1982 | Smith |
| 6,320,273 | B1 | 11/2001 | Nemec |
| 6,726,439 | B2 | 4/2004 | Mikhail et al. |
| 6,853,096 | B1 | 2/2005 | Yu et al. |
| 6,864,597 | B1 | 3/2005 | Ricker |

FOREIGN PATENT DOCUMENTS

| | | |
|---|---|---|
| FR | 2473465 | 7/1981 |
| RU | 2694610 | 1/2002 |

OTHER PUBLICATIONS

Translation of abstract of EP0780238 (Year: 1997).*
Translation of description of EP0780238 (Year: 1977).*
Translation of abstract of JP2014198427 (Year: 2014).*
Translation of description of JP2014198427 (Year: 2014).*
Written Opinion of WO2025184336 (Year: 2025).*
Translation of WO2012003075 (Year: 2012).*

* cited by examiner

*Primary Examiner* — Sonya M Sengupta
(74) *Attorney, Agent, or Firm* — Allen D Hertz, P.A.; Allen D. Hertz

(57) ABSTRACT

A method of fabricating a thermal transfer image by utilizing a Thermoplastic Polyurethane (TPU) colored in white as the white pigment of the thermal transfer image. Various colored inks are applied to a substrate in accordance with their respective layers of colors of the desired artwork image design. The process leaves voids where white is desired for the artwork image. The process applies a clear ink over the image, including locations of the artwork image where white is the desired visible color. Thermoplastic Polyurethane (TPU) is applied in a powder form to an area covering the applied clear ink while the applied clear ink remains wet. Excess TPU is removed from the substrate in areas of the image void of any wet ink. The TPU residing on the wet ink is annealed using any heat applying process.

20 Claims, 8 Drawing Sheets

METHOD OF FABRICATING A THERMAL TRANSFER IMAGE

CROSS-REFERENCE TO RELATED APPLICATION

This Non-Provisional Utility Patent application claims the benefit of U.S. Provisional Patent Application Ser. No. 63/558,632 filed on Feb. 27, 2024, wherein the application is incorporated herein in its entirety.

FIELD OF THE INVENTION

The present invention relates to the field of printing. In particular, the present invention relates to a method of fabricating a thermal transfer image.

BACKGROUND OF THE INVENTION

Thermal transfer images are generated by applying colors, including white, to a substrate, than applying TPU (Thermoplastic Polyurethane) to the wet ink. Colored ink tends to conceal imperfections, contaminants, or other defects in the ink. Conversely, white ink tends to embellish imperfections, contaminants, or other defects in the ink.

The process for fabricating a thermal transfer image applies a TPU (Thermoplastic Polyurethane) to the wet ink applied to a substrate. Imperfections introduced by the TPU (Thermoplastic Polyurethane) tend to be embellished in the white ink.

Thus, there presently exists a need for providing a method of fabricating thermal transfer images that are free from any visible imperfections in the artwork, more specifically in the portions of the artwork presenting white color.

BRIEF SUMMARY OF THE INVENTION

The present invention provides a method for fabricating thermal transfer images that are free from any visible imperfections in the artwork, more specifically, free from any visible imperfections in the portions of the artwork displaying white.

The present invention provides a method of applying a clear ink in at least areas where the image presents white pigments and applying a Thermoplastic Polyurethane (TPU) in a white pigment over the entire printed image, wherein the white coloration of the Thermoplastic Polyurethane (TPU) provides the white pigment in the respective white areas of the image.

In one aspect, the present invention is directed towards a method of generating a thermal transfer image in accordance with the present invention includes steps of:

- applying a clear ink onto a substrate wherein the clear ink is applied following an outline of an artwork image carried by the substrate, wherein areas of the artwork having a color of a Thermoplastic Polyurethane (TPU) remain void;
- applying the Thermoplastic Polyurethane (TPU) in a powder form to an area covering the applied clear ink while the applied clear ink remains wet;
- removing any excess Thermoplastic Polyurethane (TPU) from the substrate in areas of the image void of the wet ink;
- curing (annealing) the Thermoplastic Polyurethane (TPU) residing on the wet ink.

In a second aspect, the process further comprising a step of applying colored ink to the image.

In yet another aspect, the Thermoplastic Polyurethane (TPU) is white in color.

In yet another aspect, the process further comprising a step of:

- applying at least one colored ink in accordance with a layer of the image designed to receive the at least one respective colored ink onto a substrate,
- wherein the step of applying the at least one colored ink onto the substrate creates the artwork image,
- wherein the step of applying the at least one colored ink onto the substrate occurs prior to the step of applying the clear ink onto the substrate.

In yet another aspect, the process further comprising a step of applying colored ink to the image, wherein the image remains void of colored ink in areas designed to display white pigment.

In yet another aspect, the process further comprising a step of determining which colored ink/inks is/are to be applied to the substrate to create the image.

In yet another aspect, the at least one colored ink is at least one of an organic ink, an inorganic ink, a pigmented ink, and a sublimation ink.

In yet another aspect, the at least one colored ink is selected from a group of inks, the group of inks consisting of: cyan colored ink, magenta colored ink, yellow colored ink, key colored ink, yellow colored ink, light cyan colored ink, light magenta colored ink, gray colored ink, red colored ink, green colored ink, blue colored ink, an ink composition comprising a metallic component, an ink composition comprising a metallic copper component, an ink composition comprising a metallic bronze component, an ink composition comprising a metallic zinc component, an ink composition comprising a metallic aluminum component, an ink composition comprising a metallic silver component, an ink composition comprising a metallic gold component, and an ink composition comprising a glow in the dark element.

In yet another aspect, the process utilizes combination of colored inks including Cyan, Magenta, and Yellow.

In yet another aspect, the process utilizes combination of colored inks including Cyan, Magenta, Yellow, and Black.

In yet another aspect, the process utilizes combination of colored inks including Cyan, Magenta, Yellow, Light Cyan, Light Magenta, and Gray.

In yet another aspect, the process utilizes combination of colored inks including Cyan, Magenta, Yellow, Light Cyan, Light Magenta, Gray, and Black.

In yet another aspect, the process utilizes combination of colored inks including Cyan, Magenta, Yellow, Light Cyan, Light Magenta, and Black.

In yet another aspect, the process utilizes combination of colored inks including Red, Green, and Blue.

In yet another aspect, the process utilizes combination of colored inks including Red, Green, and Blue, and Black.

In yet another aspect, the process utilizes as least one metallic ink.

In yet another aspect, the ink composition includes a metallic component.

In yet another aspect, the ink composition includes a metallic component, wherein the metallic component is at least one of copper, bronze, zinc, aluminum, silver and gold.

In yet another aspect, the ink composition includes a glow in the dark element.

In yet another aspect, the step of curing (annealing) the TPU residing on the wet ink is accomplished using at least one of a heating element, an ultraviolet light source, and a laser.

In yet another aspect, the step of curing (annealing) the TPU residing on the wet ink is accomplished by applying heat to the TPU.

In yet another aspect, the step of curing (annealing) the TPU residing on the wet ink is accomplished by exposing the TPU to ultraviolet light.

In yet another aspect, the step of curing (annealing) the TPU residing on the wet ink is accomplished by laser sintering the TPU.

In yet another aspect, at least one of the following steps is accomplished using an ink jet printer:

(a) a step of applying at least one colored ink in accordance with a layer of the image designed to receive the at least one respective colored ink onto a substrate, (b) the step of applying the clear ink onto the substrate, and (c) the step of applying Thermoplastic Polyurethane (TPU) in the powder form to the area covering the applied clear ink while the applied clear ink remains wet.

In yet another aspect, a single machine accomplishes each of the following steps:

applying the clear ink onto the substrate wherein the clear ink is applied following the outline of an artwork image carried by the substrate, wherein portions of the artwork image that are of a color of a Thermoplastic Polyurethane (TPU) remain unprinted;

applying the Thermoplastic Polyurethane (TPU) in the powder form to the area covering the applied clear ink while the applied clear ink remains wet;

removing any excess Thermoplastic Polyurethane (TPU) from the substrate in areas of the image void of the wet ink; and annealing the Thermoplastic Polyurethane (TPU) residing on the wet ink.

In yet another aspect, the printed and cured image is distributed to an image applying party.

In yet another aspect, the method further comprising steps of:

locating the artwork image onto a desired location on an object; and applying heat to the thermal transfer image to transfer the thermal transfer image onto the object.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. In other implementations, well-known features and methods have not been described in detail so as not to obscure the invention. For purposes of description herein, the terms “upper”, “lower”, “left”, “right”, “front”, “back”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments that may be disclosed herein are not to be considered as limiting, unless the claims expressly state otherwise.

The present invention describes an improved process for fabricating a thermally transferred image, wherein the improved process resolves a long standing issue where imperfections, contaminants, or other defects in the ink are visible in the printed image. More specifically, where imperfections, contaminants, or other defects in the ink are embellished in the white portions of the printed image.

Figure 8:
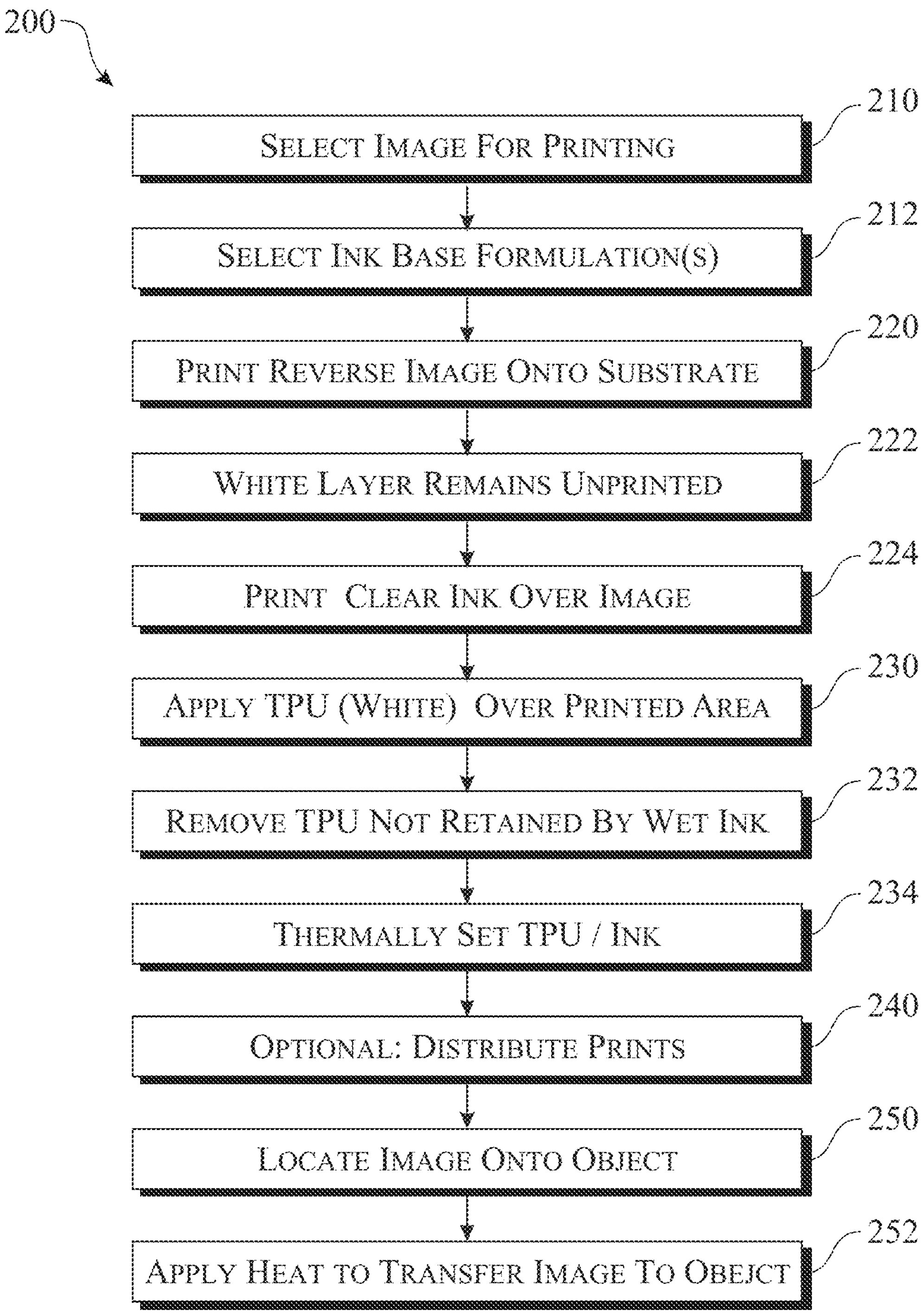
FIG. 8 presents an exemplary thermal transfer image fabrication flow diagram detailing steps for fabricating the thermal transfer image.

The process is summarized in an exemplary thermal transfer image generation process flow diagram 200 presented in FIG. 8. Each of the steps described in the thermal transfer image generation process flow diagram 200 are diagrammatically exemplified in drawings illustrated in FIGS. 1 through 6. The thermal transfer image generation process flow diagram 200 initiates with a step of selecting a desired image 120 for printing (block 210). A colored ink set 121 is determined based upon the various colors and desired features of the artwork used for the desired image 120. The artwork is separated into the layers for each of the respective colors associated with the ink set 121 and additionally with considerations for a layer for a white pigment. Each of the respective separated color layers is associated with a respective ink color in the digital format. This includes a layer that is established for the white pigment. The layer identifying the white pigment can be limited to the areas where the white pigment is applied to the artwork or, for the used in the present invention; the layer identifying the white pigment can be modified to include an outline containing the entire desired image 120.

The digital artwork associated with the desired image 120 is uploaded to a printer (not shown but exemplified by a color ink print applicator 192, a clear ink print applicator 194, a Thermoplastic Polyurethane (TPU) applicator 196 and a thermal applicator 199). The color ink set (colors, formulations, etc.) 121 required to generate the colored portion of the desired image are selected and installed into the printer (block 212). The most common color ink set 121 is referred to as CMYK, which refers to cyan, magenta, yellow, and key (black). The exemplary illustrations present CMYK as the selected color ink set 121 for the exemplary desired image 120.

Figure 1:
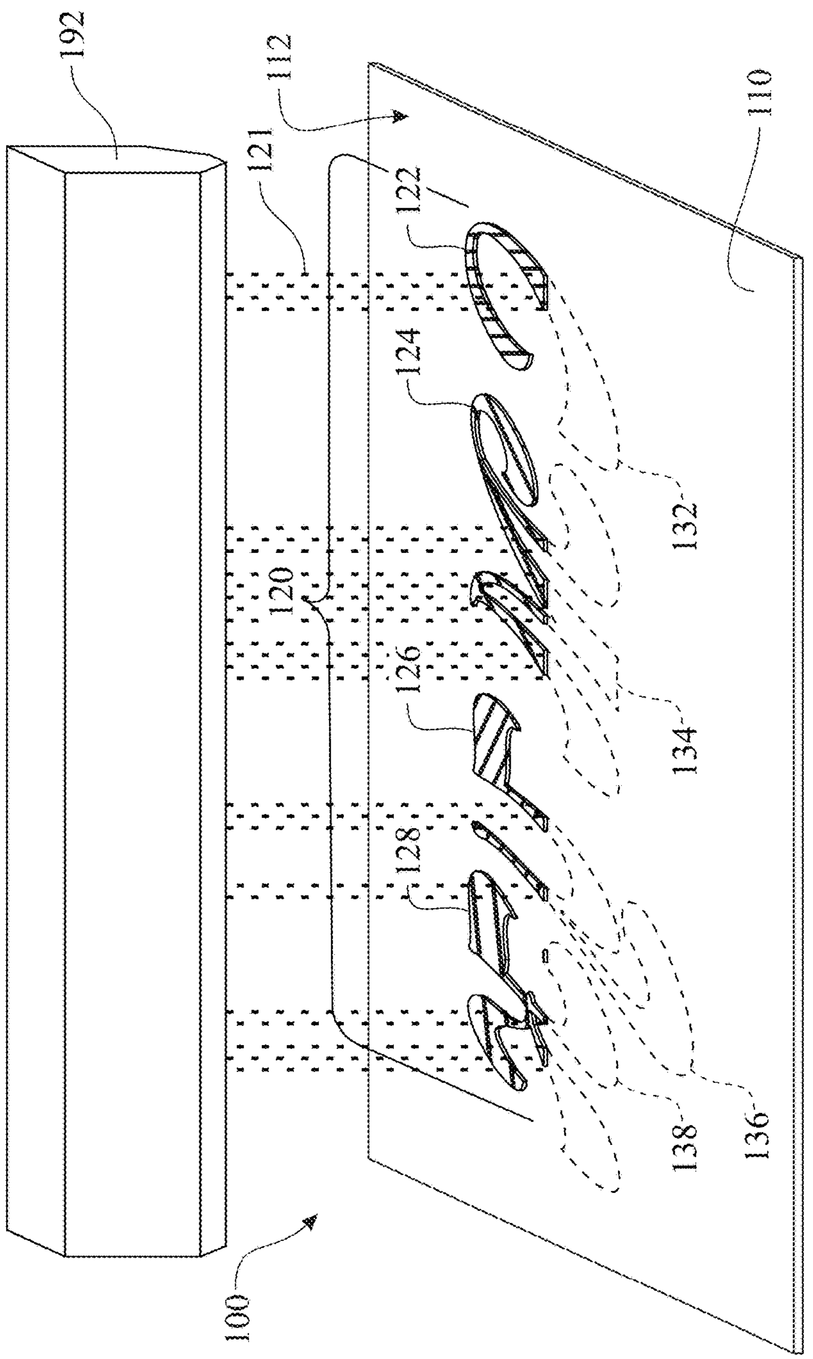
FIG. 1 presents an isometric top view of a first exemplary step of a method of fabricating a thermal transfer image, the first step providing a process of applying non-white colored ink onto a substrate.
Figure 2:
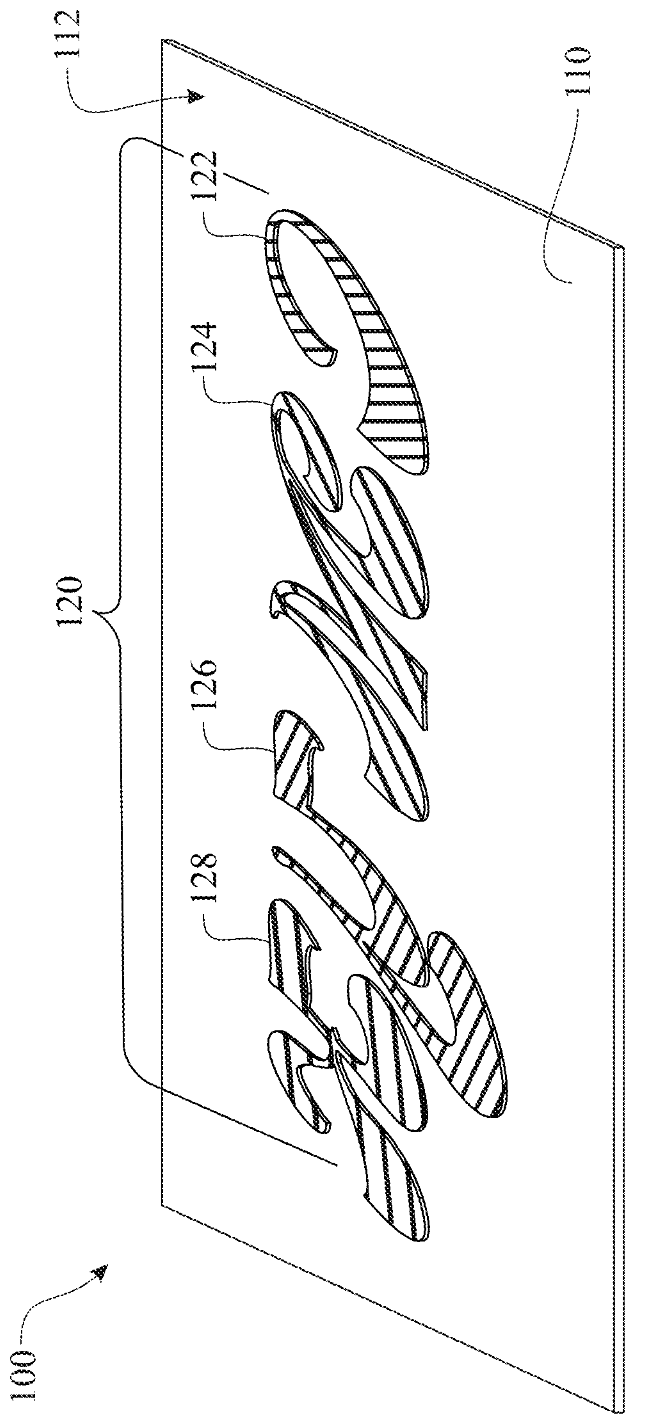
FIG. 2 presents an isometric top view of a partially completed thermal transfer image following the first exemplary step of the method of fabricating a thermal transfer image wherein the non-white colored ink has been applied to the substrate.

A reverse image of the desired image 120 is applied to a thermal transfer print substrate image receiving surface 112 of a thermal transfer print substrate 110, as illustrated in FIGS. 1 and 2 (block 220). The exemplary illustration presents a color ink print applicator 192 of an ink jet printer applying the color ink set 121 in accordance with the digital layout of the desired image 120 onto the thermal transfer print substrate image receiving surface 112 of the thermal transfer print substrate 110. In the exemplary illustration, the color ink set 121 is applying four colors: a exemplary first ink color deposit (cyan) 122 in accordance with a exemplary first color image layer (cyan) 132, a exemplary second ink color deposit (magenta) 124 in accordance with a exemplary second color image layer (magenta) 134, a exemplary third ink color deposit (yellow) 126 in accordance with a exemplary third color image layer (yellow) 136, and a exemplary fourth ink color deposit (key/black) 128 in accordance with a exemplary fourth color image layer (key/black) 138, as illustrated in FIG. 1. The resulting color image 120 is illustrated in FIG. 2. It is noted that areas designed to present white pigment remains unprinted (block 222). The ink can be at least one of organic, inorganic, an ink pigment and sublimation.

Figure 3:
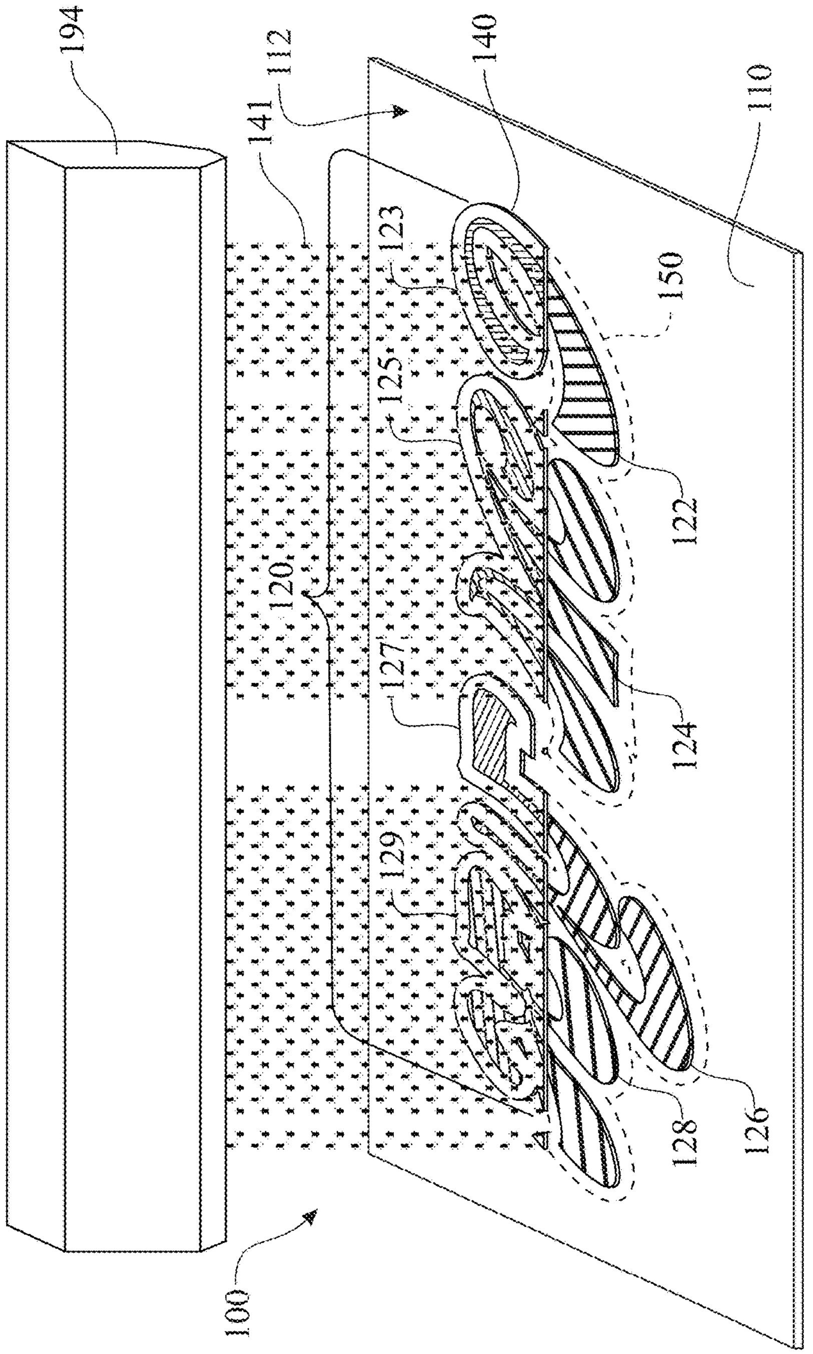
FIG. 3 presents an isometric top view of a second exemplary step of the method of fabricating the thermal transfer image, the second step providing a process of applying a clear ink onto the substrate in locations where white is the designed pigment.
Figure 4:
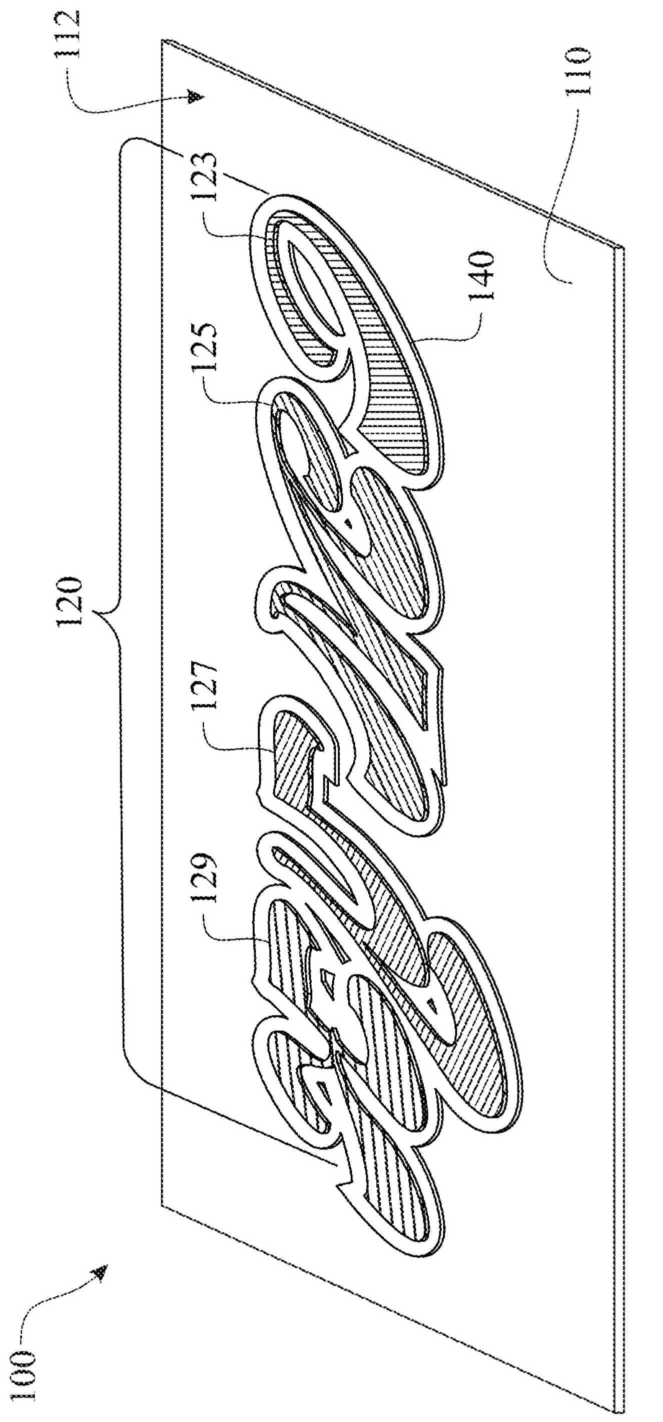
FIG. 4 presents an isometric top view of a partially completed thermal transfer image following the second exemplary step of the method of fabricating a thermal transfer image wherein the clear colored ink has been applied onto the substrate at least in locations where white is the designed pigment with the exemplary illustration presenting an application of the clear colored ink has been applied onto the substrate covering the entire colored image and additional locations where white is the designed pigment.

Clear ink 141 is applied using a clear ink print applicator 194 of the ink jet printer creating a exemplary clear ink deposit 140 in accordance with a exemplary clear ink image layer 150, as illustrated in FIGS. 3 and 4 (block 224). The clear ink 141 can be applied only where the white pigment is desired or over the exposed areas where the white pigment is desired and over the applied color ink 123, 125, 127, 129, as illustrated in FIGS. 3 and 4. The shading of exemplary first ink color deposit (cyan) 122, exemplary second ink color deposit (magenta) 124, exemplary third ink color deposit (yellow) 126, and exemplary fourth ink color deposit (key/black) 128 as illustrated in FIGS. 1 and 2 indicates exposed color ink, wherein the differing shading of exemplary first clear covered ink color deposit (cyan) 123, exemplary second clear covered ink color deposit (magenta) 125, exemplary third clear covered ink color deposit (yellow) 127, and exemplary fourth clear covered ink color deposit (key/black) 129 as illustrated in FIGS. 3 and 4 indicates color ink covered by the clear ink as described.

Figure 5:
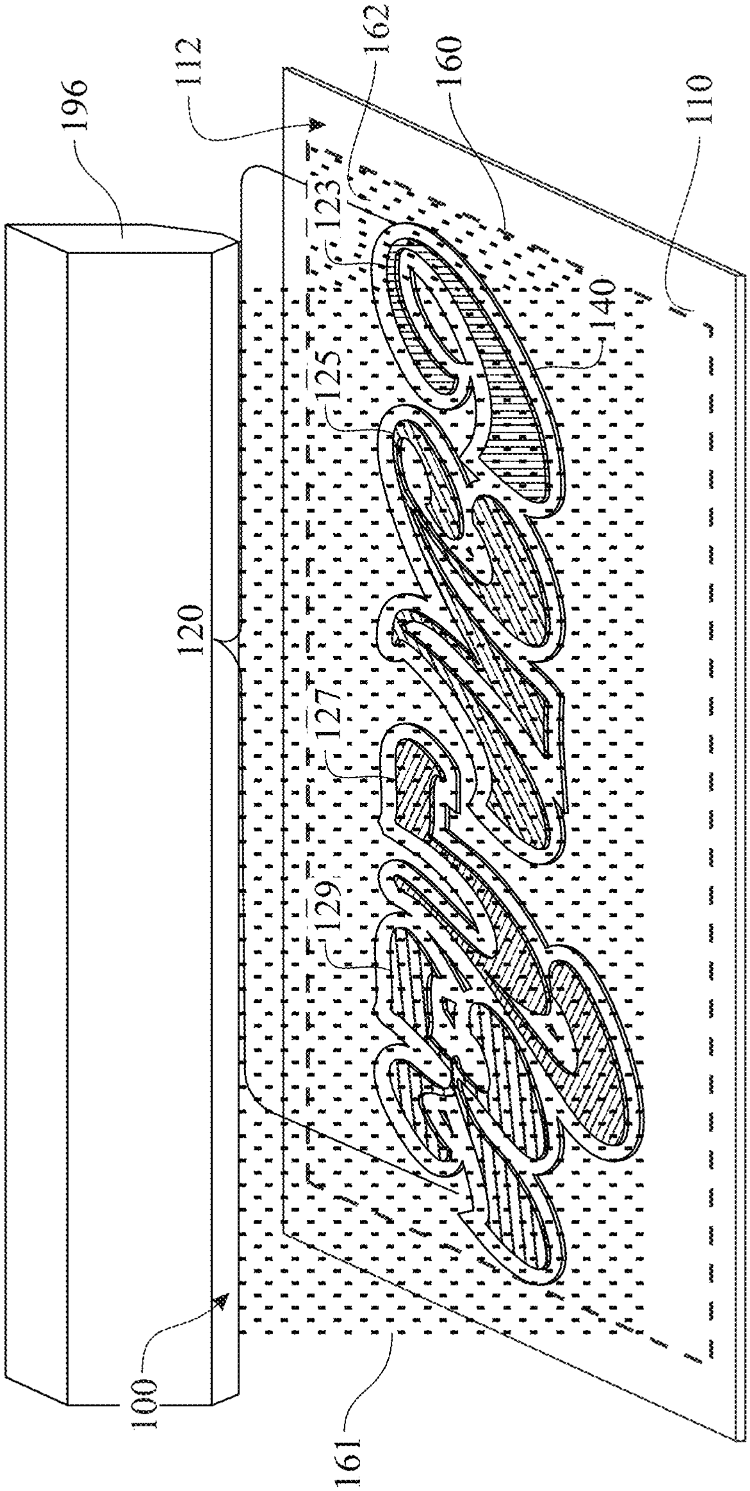
FIG. 5 presents an isometric top view of a third exemplary step of the method of fabricating the thermal transfer image, the third step providing a process of applying a Thermoplastic Polyurethane (TPU) in a fine powdered form over an area encompassing the entire application of the wet ink.
Figure 6:
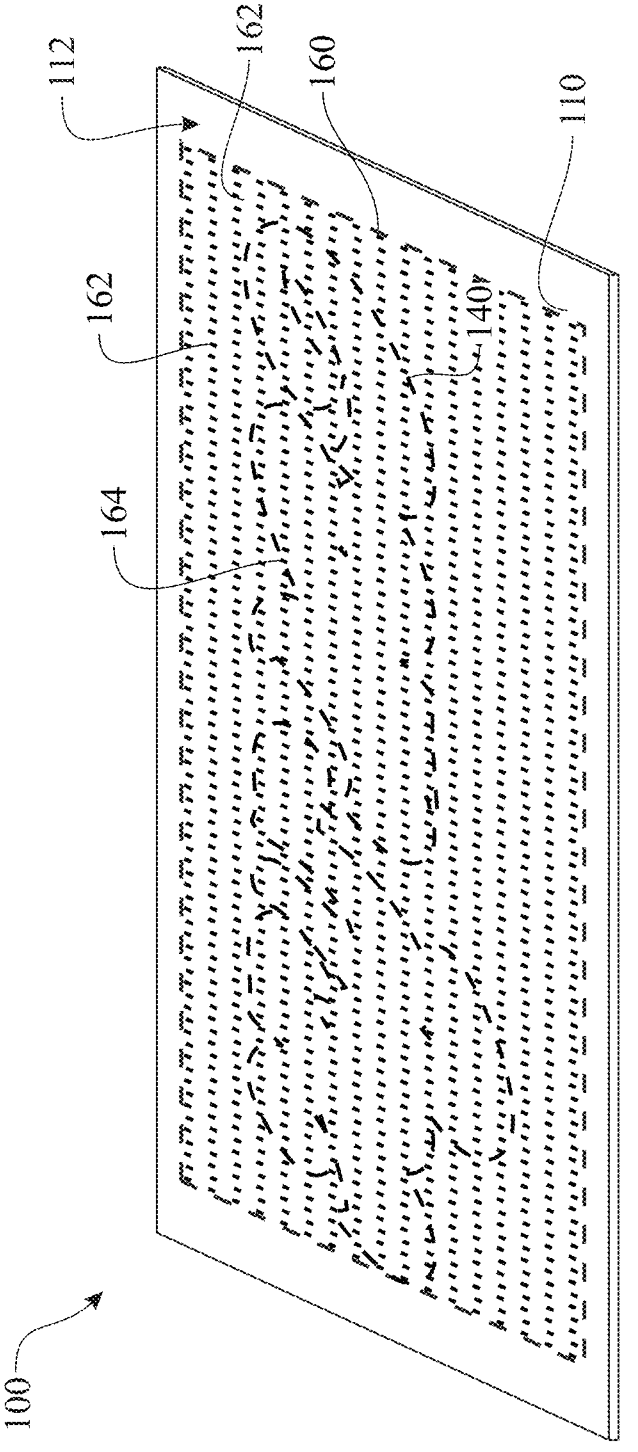
FIG. 6 presents an isometric top view of a partially completed thermal transfer image following the third exemplary step of the method of fabricating a thermal transfer image wherein the fine powdered form of the Thermoplastic Polyurethane (TPU) has been applied onto the substrate covering an area encompassing the entire application of the wet ink.
Figure 7:
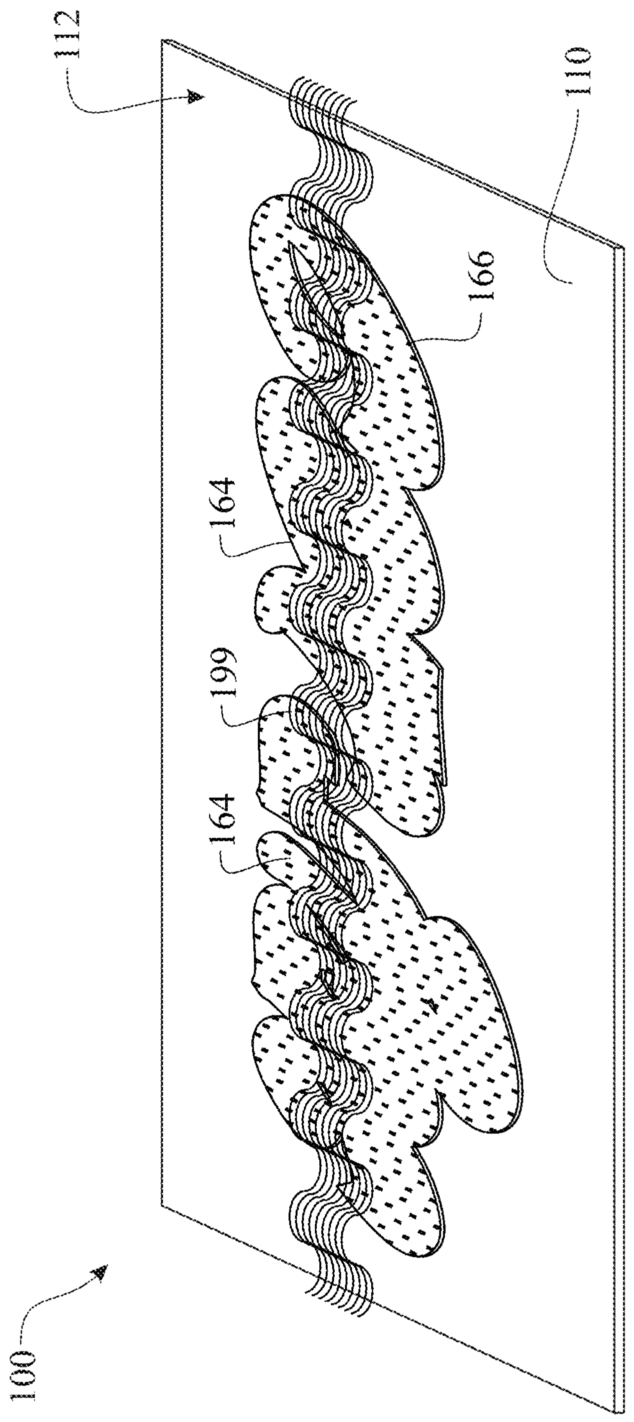
FIG. 7 presents an isometric top view of a fourth exemplary step of the method of fabricating the thermal transfer image, the fourth step providing a process of removing excessive Thermoplastic Polyurethane (TPU) material from the substrate not covered by wet ink and annealing the remaining TPU retained covering the entire image by the wet ink.

A Thermoplastic Polyurethane (TPU) applicator 196 applies Thermoplastic Polyurethane (TPU) 161 having a white coloration in a powdered form covering the desired image 120. While the applied clear ink is still wet, Thermoplastic Polyurethane (TPU) 161 is applied to the thermal transfer print substrate image receiving surface 112 by the Thermoplastic Polyurethane (TPU) applicator 196 of the ink jet printer over a Thermoplastic Polyurethane (TPU) target coverage area 160 depositing a Thermoplastic Polyurethane (TPU) applied powder 162 to cover (and preferably an area larger than) the entire printed image 120 (block 230) as illustrated in FIG. 5. In the exemplary illustration, the Thermoplastic Polyurethane (TPU) applied powder 162 is applied over the entire area of the Thermoplastic Polyurethane (TPU) target coverage area 160. This includes both areas having wet ink (exemplary clear ink deposit 140 in the exemplary illustration) and areas of the thermal transfer print substrate image receiving surface 112 that are void of any wet ink. Excess Thermoplastic Polyurethane (TPU) applied powder 162 not retained by any wet ink is removed using any suitable process, leaving Thermoplastic Polyurethane (TPU) applied powder 162 that is retained by the wet ink, as illustrated in FIG. 7 (block 232). The removal process can be accomplished using any of: a shaking process, an airflow process, or any other suitable removal process.

The Thermoplastic Polyurethane (TPU) applied powder 162 retained by the wet ink (defining a annealed Thermoplastic Polyurethane (TPU) material outline 166) is annealed (cured) forming an annealed Thermoplastic Polyurethane (TPU) material 164 by any suitable process, such as a thermal applicator 199, as illustrated in FIG. 7 (block 234). The annealing process can be accomplished by applying heat to the Thermoplastic Polyurethane (TPU) applied powder 162, using a heating element, Ultra-violet, a laser, or any other suitable process for elevating the temperature of the Thermoplastic Polyurethane (TPU) applied powder 162 to melt the particles of the Thermoplastic Polyurethane (TPU) applied powder 162 together forming the annealed Thermoplastic Polyurethane (TPU) material 164, as illustrated in FIG. 7. The annealed Thermoplastic Polyurethane (TPU) material 164 provides the white coloring for all areas of the image 120 that are void of colored ink 121 and having clear ink 141. The use of the white pigmented Thermoplastic Polyurethane (TPU) material 161 avoids any imperfections, contaminants, or other defects in the ink, more specifically, the white colored ink. By using clear ink 141, the white pigmented Thermoplastic Polyurethane (TPU) material 161 provides the consistent coloring for the white portions of the image 120, thus avoiding any imperfections, contaminants, or other defects in the white portion of the image 120.

Once the Thermoplastic Polyurethane (TPU) applied powder 162 is annealed into the annealed Thermoplastic Polyurethane (TPU) material 164, the desired image 120 of the thermal transfer printed assembly 100 is ready for transfer onto an object. The thermal transfer print substrate 110 can be provided as individual sheets or on a continuous roll. Each thermal transfer printed assembly 100 is prepared for distribution. In a condition where the thermal transfer print substrate 110 is provided as a continuous roll, each of the thermal transfer printed assemblies 100 can be singulated for packaging and distribution. The completed thermal transfer printed assemblies 100 are optionally packaged and distributed from the printing location to an application location (block 240). The receiving object is placed upon an anvil of a thermal image transfer application apparatus. The thermal transfer printed assembly 100 is placed upon the receiving object orienting the desired image 120 at the desired location on the receiving object. The thermal transfer printed assembly 100 is orientated with the annealed Thermoplastic Polyurethane (TPU) material 164 side contacting the image receiving surface of the receiving object (block 250). Heat is applied to the thermal transfer printed assembly 100, transitioning a state of the annealed Thermoplastic Polyurethane (TPU) material 164 from a solid into an adhesive, and using the annealed Thermoplastic Polyurethane (TPU) material 164 to bond the desired image 120 to the image receiving surface of the receiving object (block 252).

The object can be a textile, a solid object, a planar object, or with advancements to the anvil and the heating source, the object can be a three-dimensional object.

The processes described herein can be modified while maintaining the spirit and intent of the present invention. For example, as described above, the clear ink 141 can be applied to the areas where white is displayed in the image 120 or, in an alternative, can be applied to the entire image 120, including the voids where the white is displayed and the colored ink. The process for applying the ink can vary, wherein the ink can be applied using any suitable known ink application processes. The colors and compositions of the ink can vary based upon the desired final image. The equipment for accomplishing each of the steps for creating the thermal transfer printed assembly 100, including the color ink print applicator 192, the clear ink print applicator 194, the Thermoplastic Polyurethane (TPU) applicator 196, and the thermal applicator 199, can be integrated into a single machine.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

REFERENCE ELEMENT DESCRIPTIONS

Ref No. Description
100 thermal transfer printed assembly
110 thermal transfer print substrate
112 thermal transfer print substrate image receiving surface
120 desired image
121 color ink set
122 exemplary first ink color deposit (cyan)
123 exemplary first clear covered ink color deposit (cyan)
124 exemplary second ink color deposit (magenta)
125 exemplary second clear covered ink color deposit (magenta)
126 exemplary third ink color deposit (yellow)
127 exemplary third clear covered ink color deposit (yellow)
128 exemplary fourth ink color deposit (key/black)
129 exemplary fourth clear covered ink color deposit (key/black)
132 exemplary first color image layer (cyan)
134 exemplary second color image layer (magenta)
136 exemplary third color image layer (yellow)
138 exemplary fourth color image layer (key/black)
140 exemplary clear ink deposit
141 clear ink application
150 exemplary clear ink image layer
160 Thermoplastic Polyurethane (TPU) target coverage area
161 Thermoplastic Polyurethane (TPU)
162 Thermoplastic Polyurethane (TPU) applied powder
164 annealed Thermoplastic Polyurethane (TPU) material
166 annealed Thermoplastic Polyurethane (TPU) material outline
192 color ink print applicator
194 clear ink print applicator
196 Thermoplastic Polyurethane (TPU) applicator
199 thermal applicator
200 thermal transfer image generation process flow diagram
210 select image for printing step
212 select ink type for printing step
220 print color ink on color portion of reverse image onto substrate
222 white layer is excluded from printing step
224 print clear ink onto/over image
230 apply TPU over wet ink of printed area
232 remove excess TPU from non printed area
234 thermally set TPU on wet ink area of image
240 optional print distribution step
250 locate image on object
252 apply heat to thermally transfer image to object

What is claimed is:

1. A method of fabricating a thermal transfer image, the method comprising steps of:
- applying a clear ink onto a substrate wherein the clear ink is applied following an outline of an artwork image carried by the substrate, wherein portions of the artwork image having a color of a Thermoplastic Polyurethane (TPU) remain unprinted;
- applying the Thermoplastic Polyurethane (TPU) in a powder form to an area covering the applied clear ink while the applied clear ink remains wet;
- removing any excess Thermoplastic Polyurethane (TPU) from the substrate in areas of the image void of the wet ink; and
- annealing the Thermoplastic Polyurethane (TPU) residing on the wet ink.

2. The method of fabricating a thermal transfer image as recited in claim 1, wherein the Thermoplastic Polyurethane (TPU) is white in color.

3. The method of fabricating a thermal transfer image as recited in claim 1, the method further comprising a step of:
- applying at least one colored ink in accordance with a layer of the image designed to receive the at least one respective colored ink onto a substrate, wherein the step of applying the at least one colored ink onto the substrate creates the artwork image, wherein the step of applying the at least one colored ink onto the substrate occurs prior to the step of applying the clear ink onto the substrate.

4. The method of fabricating a thermal transfer image as recited in claim 1, the method further comprising a step of:

applying at least one colored ink in accordance with a layer of the image designed to receive the at least one respective colored ink onto a substrate, wherein the at least one colored ink is at least one of an organic ink, an inorganic ink, a pigmented ink, and a sublimation ink, wherein the step of applying the at least one colored ink onto the substrate creates the artwork image, wherein the step of applying the at least one colored ink onto the substrate occurs prior to the step of applying the clear ink onto the substrate.

5. The method of fabricating a thermal transfer image as recited in claim 1, the method further comprising a step of:

applying at least one colored ink in accordance with a layer of the image designed to receive the at least one respective colored ink onto a substrate, wherein the at least one colored ink is selected from a group of inks, the group of inks consisting of: cyan colored ink, magenta colored ink, yellow colored ink, key colored ink, yellow colored ink, light cyan colored ink, light magenta colored ink, gray colored ink, red colored ink, green colored ink, blue colored ink, an ink composition comprising a metallic component, an ink composition comprising a metallic copper component, an ink composition comprising a metallic bronze component, an ink composition comprising a metallic zinc component, an ink composition comprising a metallic aluminum component, an ink composition comprising a metallic silver component, an ink composition comprising a metallic gold component, and an ink composition comprising a glow in the dark element;

wherein the step of applying the at least one colored ink onto the substrate creates the artwork image, wherein the step of applying the at least one colored ink onto the substrate occurs prior to the step of applying the clear ink onto the substrate.

6. The method of fabricating a thermal transfer image as recited in claim 1, wherein at least one of the following steps is accomplished using an ink jet printer:

(a) a step of applying at least one colored ink in accordance with a layer of the image designed to receive the at least one respective colored ink onto a substrate, (b) the step of applying the clear ink onto the substrate, and (c) the step of applying Thermoplastic Polyurethane (TPU) in the powder form to the area covering the applied clear ink while the applied clear ink remains wet.

7. The method of fabricating a thermal transfer image as recited in claim 1, wherein the step of removing any excess TPU from the substrate in areas of the image void of the wet ink is accomplished using at least one of a shaking process and an airflow process.

8. The method of fabricating a thermal transfer image as recited in claim 1, wherein the step of annealing the Thermoplastic Polyurethane (TPU) residing on the wet ink is accomplished using at least one of a heating element, an ultraviolet light source, and a laser.

9. The method of fabricating a thermal transfer image as recited in claim 1, the method further comprising steps of:

locating the artwork image onto a desired location on an object, and applying heat to the thermal transfer image to transfer the thermal transfer image onto the object.

10. The method of fabricating a thermal transfer image as recited in claim 1, wherein a single machine accomplishes each of the following steps:

applying the clear ink onto the substrate wherein the clear ink is applied following the outline of an artwork image carried by the substrate;

applying Thermoplastic Polyurethane (TPU) in the powder form to the area covering the applied clear ink while the applied clear ink remains wet;

removing any excess Thermoplastic Polyurethane (TPU) from the substrate in areas of the image void of the wet ink; and annealing the Thermoplastic Polyurethane (TPU) residing on the wet ink.

11. A method of fabricating a thermal transfer image, the method comprising steps of:

applying a clear ink onto a substrate wherein the clear ink is applied following an outline of an artwork image carried by the substrate, wherein white portions of the artwork image remain unprinted;

applying a Thermoplastic Polyurethane (TPU) in a powder form to an area covering the applied clear ink while the applied clear ink remains wet, wherein the Thermoplastic Polyurethane (TPU) is white in color;

removing any excess Thermoplastic Polyurethane (TPU) from the substrate in areas of the image void of the wet ink; and annealing the Thermoplastic Polyurethane (TPU) residing on the wet ink.

12. The method of fabricating a thermal transfer image as recited in claim 11, the method further comprising a step of:

applying at least one colored ink in accordance with a layer of the image designed to receive the at least one respective colored ink onto a substrate, wherein the step of applying the at least one colored ink onto the substrate creates the artwork image, wherein the step of applying the at least one colored ink onto the substrate occurs prior to the step of applying the clear ink onto the substrate.

13. The method of fabricating a thermal transfer image as recited in claim 11, the method further comprising a step of:

applying at least one colored ink in accordance with a layer of the image designed to receive the at least one respective colored ink onto a substrate, wherein the at least one colored ink is selected from a group of inks, the group of inks consisting of: cyan colored ink, magenta colored ink, yellow colored ink, key colored ink, yellow colored ink, light cyan colored ink, light magenta colored ink, gray colored ink, red colored ink, green colored ink, blue colored ink, an ink composition comprising a metallic component, an ink composition comprising a metallic copper component, an ink composition comprising a metallic bronze component, an ink composition comprising a metallic zinc component, an ink composition comprising a metallic aluminum component, an ink composition comprising a metallic silver component, an ink composition comprising a metallic gold component, and an ink composition comprising a glow in the dark element;

wherein the step of applying the at least one colored ink onto the substrate creates the artwork image, wherein the step of applying the at least one colored ink onto the substrate occurs prior to the step of applying the clear ink onto the substrate.

14. The method of fabricating a thermal transfer image as recited in claim 11, wherein at least one of the following steps is accomplished using an ink jet printer:

(a) a step of applying at least one colored ink in accordance with a layer of the image designed to receive the at least one respective colored ink onto a substrate, (b) the step of applying the clear ink onto the substrate, and (c) the step of applying Thermoplastic Polyurethane (TPU) in the powder form to the area covering the applied clear ink while the applied clear ink remains wet.

15. The method of fabricating a thermal transfer image as recited in claim 11, wherein the step of removing any excess TPU from the substrate in areas of the image void of the wet ink is accomplished using at least one of a shaking process and an airflow process.

16. The method of fabricating a thermal transfer image as recited in claim 11, wherein the step of annealing the TPU residing on the wet ink is accomplished using at least one of a heating element, an ultraviolet light source, and a laser.

17. The method of fabricating a thermal transfer image as recited in claim 11, the method further comprising steps of:

locating the artwork image onto a desired location on an object, and applying heat to the thermal transfer image to transfer the thermal transfer image onto the object.

18. The method of fabricating a thermal transfer image as recited in claim 11, wherein a single machine accomplishes each of the following steps:

applying the clear ink onto the substrate wherein the clear ink is applied following the outline of an artwork image carried by the substrate;

applying Thermoplastic Polyurethane (TPU) in the powder form to the area covering the applied clear ink while the applied clear ink remains wet;

removing any excess Thermoplastic Polyurethane (TPU) from the substrate in areas of the image void of the wet ink; and annealing the Thermoplastic Polyurethane (TPU) residing on the wet ink.

19. A method of fabricating a thermal transfer image, the method comprising steps of:

applying at least one colored ink to a substrate creating an artwork image upon the substrate, wherein white portions of the artwork image remain unprinted;

applying a clear ink onto the substrate wherein the clear ink is applied following an outline of the artwork image applied to the substrate;

applying a Thermoplastic Polyurethane (TPU) in a powder form to an area covering the applied clear ink while the applied clear ink remains wet, the Thermoplastic Polyurethane (TPU) being white in color;

removing any excess Thermoplastic Polyurethane (TPU) from the substrate in areas of the image void of the wet ink; and annealing the Thermoplastic Polyurethane (TPU) residing on the wet ink.

20. The method of fabricating a thermal transfer image as recited in claim 19, wherein at least one of the following steps is accomplished using an ink jet printer:

(a) the step of applying at least one colored ink to the substrate creating the artwork image, (b) the step of applying the clear ink onto the substrate, and (c) the step of applying Thermoplastic Polyurethane (TPU) in the powder form to the area covering the applied clear ink while the applied clear ink remains wet.

* * * * *